(12) United States Patent
Araújo et al.

(10) Patent No.: US 11,262,842 B2
(45) Date of Patent: Mar. 1, 2022

(54) INPUT DEVICE FOR A COMPUTING DEVICE

(71) Applicant: Telefonaktiebolaget LM Ericsson (publ), Stockholm (SE)

(72) Inventors: José Araújo, Stockholm (SE); Till Burkert, Huddinge (SE); Soma Tayamon, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/759,839

(22) PCT Filed: Nov. 13, 2017

(86) PCT No.: PCT/EP2017/079007
§ 371 (c)(1),
(2) Date: Apr. 28, 2020

(87) PCT Pub. No.: WO2019/091579
PCT Pub. Date: May 16, 2019

(65) Prior Publication Data
US 2020/0333880 A1   Oct. 22, 2020

(51) Int. Cl.
*G06F 3/01* (2006.01)

(52) U.S. Cl.
CPC .............. *G06F 3/014* (2013.01); *G06F 3/016* (2013.01)

(58) Field of Classification Search
CPC ................................. G06F 3/014; G06F 3/016
See application file for complete search history.

(56) References Cited

U.S. PATENT DOCUMENTS 3,815,761 A * 6/1974 Adam ................... B25J 15/0253
                                                       414/6
5,182,972 A * 2/1993 Skaleski .................. B25B 9/00
                                                       81/13

(Continued)

OTHER PUBLICATIONS

International Search Report and the Written Opinion of the International Searching Authority, issued in corresponding International Application No. PCT/EP2017/079007, dated Jul. 16, 2018, 13 pages.

(Continued)

*Primary Examiner* — William Lu
(74) *Attorney, Agent, or Firm* — Rothwell, Figg, Ernst & Manbeck, P.C.

(57) ABSTRACT

An input device (100) for a computing device (150) is provided, such as a data glove. The input device (100) comprises motion sensor(s) (103) configured to be worn on a fingertip or fingertips of a user, and actuator(s) (104, 114) configured to restrict motion of the fingertip(s) to be within a three-dimensional shape. The input device (100) is operative to track a position of the fingertip(s) using the motion sensor(s) (103), provide the tracked position as user input to the computing device (150), determine whether the computing device requires user input from the fingertip to be within the three-dimensional shape, and in response thereto, activate the actuator(s) (104, 114) configured to restrict motion of the fingertip(s) to be within the three-dimensional shape if the computing device (150) requires user input from the fingertip(s) to be within the three-dimensional shape. Thereby, the user is prevented from moving his/her fingertip(s) to a position in space which renders user input which is not accepted by the computing device (150) receiving the user input.

26 Claims, 4 Drawing Sheets

(56) References Cited

U.S. PATENT DOCUMENTS

| | | | | |
|---|---|---|---|---|
| 5,631,861 | A | 5/1997 | Kramer | |
| 8,696,357 | B2 * | 4/2014 | AlDossary | H04M 1/2476 434/114 |
| 10,055,022 | B2 * | 8/2018 | Appleyard | G06F 3/016 |
| 2009/0278798 | A1 * | 11/2009 | Kim | G06F 3/014 345/158 |
| 2011/0118635 | A1 * | 5/2011 | Yamamoto | A61H 1/0237 601/5 |
| 2012/0117514 | A1 * | 5/2012 | Kim | G06F 3/011 715/849 |
| 2014/0201689 | A1 * | 7/2014 | Bedikian | G06F 3/04845 715/863 |
| 2016/0018892 | A1 * | 1/2016 | Gu | G06F 3/014 345/156 |
| 2016/0030835 | A1 * | 2/2016 | Argiro | G06F 3/044 463/33 |
| 2016/0187973 | A1 * | 6/2016 | Shankar | G09G 5/18 345/156 |
| 2016/0259417 | A1 * | 9/2016 | Gu | G06F 3/014 |
| 2016/0313798 | A1 * | 10/2016 | Connor | A61B 5/0059 |
| 2016/0363997 | A1 | 12/2016 | Black et al. | |
| 2017/0131771 | A1 | 5/2017 | Keller et al. | |
| 2017/0168565 | A1 * | 6/2017 | Cohen | A61B 5/0022 |
| 2019/0310706 | A1 * | 10/2019 | Wang | H02J 50/10 |

OTHER PUBLICATIONS

Weiss, et al. "FingerFlux: Near-surface Haptic Feedback on Tabletops" Paper Session: Pointing, UIST 11, Oct. 16-19, 2011, Santa Barbara, CA, pp. 615-620.
Avatar VR, http://www.neurodigital.es/avatarvr, retrieved on Nov. 13, 2017, 3 pages.
CyberForce, http://www.cyberglovesystems.com/cyberforce, retrieved on Nov. 13, 2017, 4 pages.
CyberGlove II, http://www.cyberglovesystems.com/cyberglove-ii, retrieved on Nov. 13, 2017, 4 pages.
CyberGlove III, http://www.cyberglovesystems.com/cyberglove-iii, retrieved on Nov. 13, 2017, 4 pages.
CyberGrasp, http://www.cyberglovesystems.com/cybergrasp, retrieved on Nov. 13, 2017, 4 pages.
CyberTouch, http://www.cyberglovesystems.com/cybertouch, retrieved on Nov. 13, 2017, 4 pages.
CyberTouch II, http://www.cyberglovesystems.com/cybertouch2, retrieved on Nov. 13, 2017, 3 pages.
Gloveone, http://www.neurodigital.es/gloveone, retrieved on Nov. 13, 2017, 3 pages.
Keyglove, http://www.keyglove.net, retrieved on Nov. 13, 2017, 5 pages.
VRGluv, http://www.vrgluv.com, retrieved on Nov. 13, 2017, 4 pages.

* cited by examiner though, the CyberForce (http://
INPUT DEVICE FOR A COMPUTING DEVICE

TECHNICAL FIELD

The invention relates to an input device for a computing device, a method of providing user input to a computing device, a corresponding computer program, and a corresponding computer program product.

BACKGROUND

In computing, an input device is a piece of hardware equipment used to provide data and control signals to a computing device, such as a computer, a laptop, a tablet, a smartphone, a media player, or the like. Examples of basic input devices include keyboard, mouse, trackpad, and joystick.

Also known are input devices in the form of a glove, also known as wired glove, data glove, or cyber glove, enabling a user wearing the glove to control a computing device by moving his/her fingers, and by means of finger and/or hand gestures. One example of such a glove is the CyberGlove (http://www.cyberglovesystems.com/cyberglove-ii and http://www.cyberglovesystems.com/cyberglove-iii, retrieved on Nov. 13, 2017). Later developments also supported haptic feedback to the user. For instance, the Cyber-Touch (http://www.cyberglovesystems.com/cybertouch and http://www.cyberglovesystems.com/cybertouch2, retrieved on Nov. 13, 2017) vibrates each individual finger of the glove when a finger touches a virtual object. The Cyber-Grasp (http://www.cyberglovesystems.com/cybergrasp, retrieved on Nov. 13, 2017) is an exoskeleton which may be programmed to prevent the user's fingers from penetrating or crushing virtual solid objects. The CyberForce (http://www.cyberglovesystems.com/cyberforce, retrieved on Nov. 13, 2017) additionally measures the precise motion of the user's entire arm and enables haptic feedback to the arm. Further examples are the Keyglove (http://www.keyglove.net, retrieved on Nov. 13, 2017), the Gloveone (https://www.neurodigital.es/gloveone, retrieved on Nov. 13, 2017), the Avatar VR (https://www.neurodigital.es/avatarvr, retrieved on Nov. 13, 2017), and the VRGluv (https://www.vrgluv.com, retrieved on Nov. 13, 2017).

SUMMARY

It is an object of the invention to provide an improved alternative to the above techniques and prior art.

More specifically, it is an object of the invention to provide improved solutions for providing user input to a computing device by utilizing one or more fingers of the user.

These and other objects of the invention are achieved by means of different aspects of the invention, as defined by the independent claims. Embodiments of the invention are characterized by the dependent claims.

According to a first aspect of the invention, an input device for a computing device is provided. The input device comprises at least one motion sensor configured to be worn on a fingertip of a user, and at least one actuator configured to restrict motion of the at least one fingertip to be within a three-dimensional shape. The input device is operative to track a position of the at least one fingertip using the at least one motion sensor and provide the tracked position as user input to the computing device. The input device is further operative to determine whether the computing device requires user input from the at least one fingertip to be within the three-dimensional shape and, in response thereto, activate the at least one actuator configured to restrict motion of the at least one fingertip to be within the three-dimensional shape if the computing device requires user input from the at least one fingertip to be within the three-dimensional shape.

According to a second aspect of the invention, a method of providing user input to a computing device is provided. The method is performed by an input device and comprises tracking a position of at least one fingertip of a user using at least one motion sensor configured to be worn on the at least one fingertip and providing the tracked position as user input to the computing device. The method further comprises determining whether the computing device requires user input from the at least one fingertip to be within a three-dimensional shape and, in response thereto, activating at least one actuator configured to restrict motion of the at least one fingertip to be within the three-dimensional shape if the computing device requires user input from the at least one fingertip to be within the three-dimensional shape.

According to a third aspect of the invention, a computer program is provided. The computer program comprises computer-executable instructions for causing an input device to perform the method according to an embodiment of the second aspect of the invention, when the computer-executable instructions are executed on a processing unit comprised in the input device.

According to a fourth aspect of the invention, a computer program product is provided. The computer program product comprises a computer-readable storage medium which has the computer program according to the third aspect of the invention embodied therein.

The invention makes use of an understanding that improved solutions for providing user input to a computing device, by virtue of using an input device for tracking the motion of at least one fingertip of the user, may be achieved by restricting the motion of the at least one fingertip, or finger or hand, to be within the three-dimensional shape if the computing device requires user input from the fingertip to be within the three-dimensional shape. Thereby, the user is prevented from moving his/her fingertip(s) to a position in space which renders user input which is not accepted by the computing device receiving the user input, or an application being executed by the computing device. For instance, this may be the case if the user uses his/her finger, fingers, or hand, for controlling a Computer Aided Design (CAD) program which, for a certain operation, expects user input to be restricted to be, e.g., within a certain object which the user designs. As another example, one may consider remote surgery, which may require that the operator (a surgeon) does not move the scalpel outside a certain three-dimensional region, which may, e.g., represent the inside of an organ, or the inside of the abdomen of a patient, excluding organs which may not be harmed. As a further example, one may consider the case of a remotely operated excavator in a mine, which may require that user input is restricted to be within a three-dimensional shape which corresponds to the walls of a tunnel in which the excavator is operating.

In the present context, a computing device may, e.g., be a computer, a laptop, a tablet, a smartphone, a media player, a vehicle, an electric tool, a television, a display, or any other type device or of apparatus comprising a processor being operative to execute computer-executable instructions for causing the device or apparatus to implement certain functionality. An embodiment of the input device may either be separate from, or comprised in, the computing device.

According to an embodiment of the invention, the three-dimensional shape is substantially two-dimensional. That is, the three-dimensional shape is a plane, and user input is accordingly restricted to be within a plane. This corresponds to user input which conventionally is provided by means of a mouse or a trackpad. In particular, the at least one actuator is configured to restrict motion of the at least one fingertip to be substantially within a plane, and the input device is operative to determine whether the computing device requires user input to be restricted accordingly. For instance, the at least one actuator which is configured to restrict motion of the at least one fingertip may comprise an electromagnet which is configured to adhere to a magnetic surface if activated. The magnetic surface may, e.g., be a metallic plate or pad, similar to a mouse pad. By virtue of the electromagnet(s), one or more fingers of the users may be "locked" to a magnetic surface, and the user's finger or fingers are accordingly restricted to move within the plane which is defined by the magnetic surface. Optionally, a strength of adhesion between the electromagnet and the magnetic surface may be controlled so as to provide a sense of friction to the at least one fingertip, i.e., tactile feedback, when moving across the magnetic surface.

According to another embodiment of the invention, the at least one actuator which is configured to restrict motion of the at least one fingertip comprises one or more haptic actuators configured to provide feedback to any one of the finger, a hand, or an arm, of the user if activated. The haptic feedback is provided if the tracked position of the at least one fingertip deviates from being within the three-dimensional shape. Different types of haptic feedback may be provided, and may range from a tactile feedback in the form of a gentle tap on the user's finger(s), hand, or arm, to kinesthetic feedback for preventing the user's finger(s) from moving outside the three-dimensional shape. For instance, the at least one actuator configured to restrict motion of the at least one fingertip may be an exoskeleton-type of actuator which is attached to an arm of the user.

According to an embodiment of the invention, the input device is further operative to position and orient the three-dimensional shape so as to reduce strain to at least one of a finger, a hand, or an arm, of the user when providing user input to the computing device. Advantageously, the user is supported in providing user input in a way which is less harmful than by using conventional means of user input.

According to an embodiment of the invention, the input device may be a glove comprising a plurality of motion sensors to be worn on respective fingertips.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings, and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
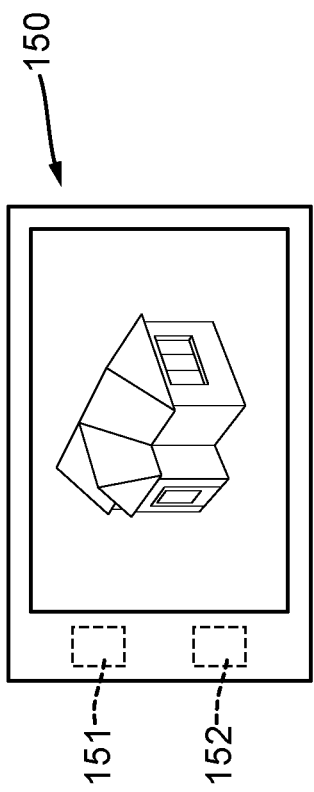
FIG. 1 shows an embodiment of the input device for a computing device.
Figure 1:
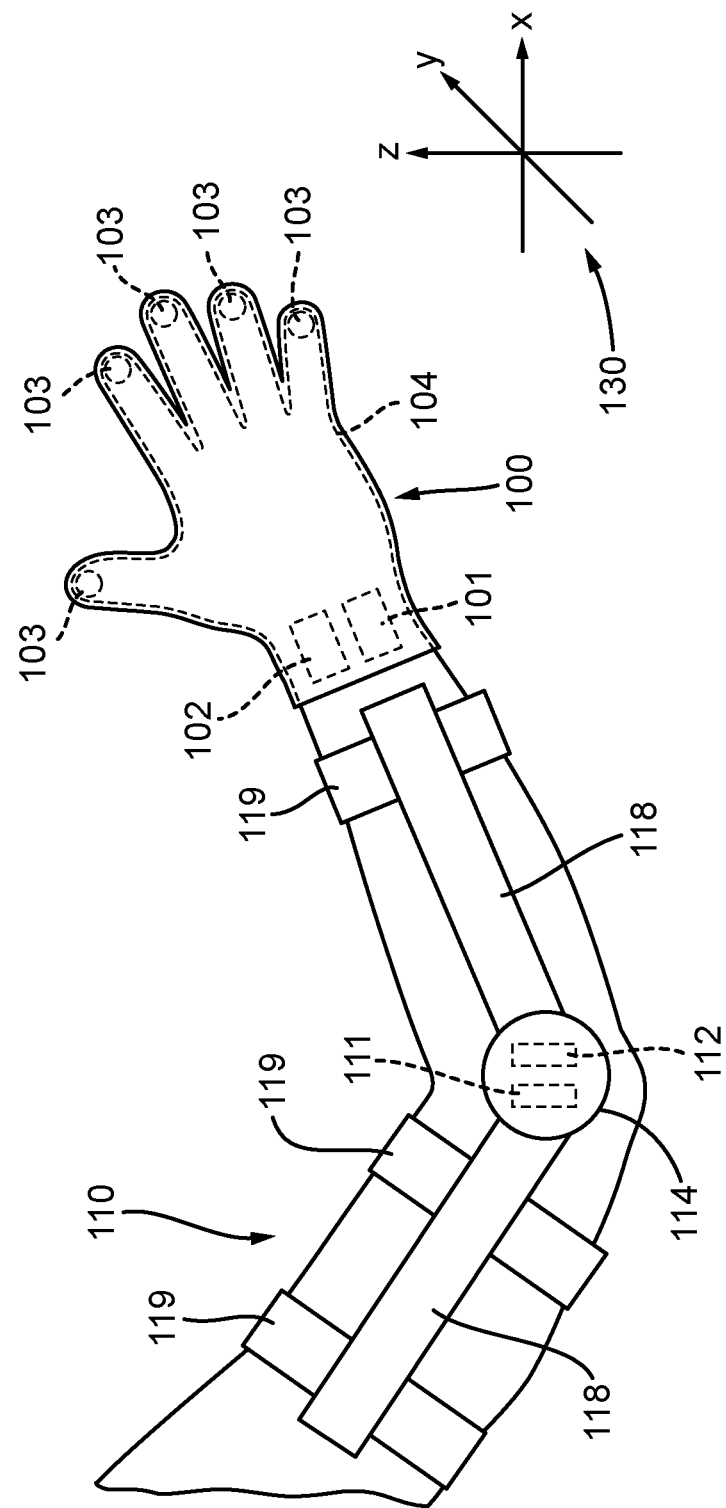

In FIG. 1, an embodiment of the input device for a computing device is illustrated as a data glove 100. In the present context, a data glove is to be understood as an input device in the form of a glove worn on the hand of a user of a computing device, and which contains various sensors that monitor the hand's motion, or movements, and transforms them into a form of user input for the computing device, e.g., for one or more applications, i.e., software, which are executed on the computing device. These applications may, e.g., be CAD or drawing applications, Virtual Reality (VR) or Augmented Reality (AR) applications, applications for controlling a vehicle or a robot, and the like. In FIG. 1, the computing device is exemplified as a tablet 150 executing a CAD program, but embodiments of the invention are not limited to any specific type of computing device. Rather, the computing device may be any type of device or apparatus comprising a processor being operative to execute computer-executable instructions, i.e., software, for causing the device or apparatus to implement certain functionality. An embodiment of the input device may either be separate from, or comprised in, the computing device. For instance, the computing device may, e.g., be a computer, a laptop, a tablet, a smartphone, a media player, a vehicle, an electric tool, a television, a display, or the like.

Further with reference to FIG. 1, input device 100 comprises processing means 101 which is operative to cause input device 100 to perform in accordance with embodiments of the invention set forth herein. Processing means 101 is described in further detail below, with reference to FIGS. 3 and 4.

Input device 100 further comprises at least one motion sensor 103 which is configured to be worn on a fingertip of a user, and input device 100 is operative to track a position of the at least one fingertip using motion sensor(s) 103. Preferably, data glove 100 comprises one motion sensor 103 at each fingertip. Motion sensor(s) 103 may, e.g., be based on any one, or a combination of, accelerometers, gyroscopes, magnetometers, and linear or rotary encoders, and are operative to track the position of motion sensor(s) 103, and accordingly that of the respective fingertip to which a motion sensor is attached, as is known in the art. Motion sensor(s) 103 are preferably integrated into input device 100, one for each fingertip, but may alternatively be provided as separate units which are configured to be attached to a fingertip, e.g., using straps. As an alternative, embodiments of the invention may also utilize an external positioning system, such as a motion capture system which typically is implemented with Infrared (IR) cameras. Such solutions may either be marker-based, e.g., VICON (https://www.vicon.com) or Qualisys (https://www.qualisys.com) or non-marker based, e.g., Leap motion (https://www.leapmotion.com/), Microsoft Kinect (https://developer.microsoft.com/en-us/windows/kinect), or Intel RealSense (https://software.intel.com/realsense). External positioning systems can also be radio-based, e.g., using Ultra-Wide Band (UWB) positioning means.

Input device 100 is further operative to provide the tracked position as user input to computing device 150. If input device 100 is separate from computing device 150, as is illustrated in FIG. 1, the tracked positions of one or more fingertips, or data derived therefrom, may be provided as user input to computing device 150 via a communications interface 102 comprised in input device 100, and a corresponding communications interface 152 comprised in computing device 150. Communications interfaces 102 and 152 may be any type of electronic circuitry, optionally in combination with software, configured to effect communications, i.e., exchange of data, with a corresponding communications interface over a medium. Such communications may either be effected over a wired medium or a wireless medium, either directly between input device 100 and computing device 150, or via one or more communications networks, such as a Local Area Network (LAN) or the Internet. For example, communications interface 102 may be based on Ethernet, Universal Serial Bus (USB), Lightning, FireWire, a short-range radio technology like Bluetooth, Near-Field Communication (NFC), Zigbee, a cellular radio technology like Global System for Mobile communications (GSM), Universal Mobile Telecommunications System (UMTS), Long Term Evolution (LTE), or a 5G technology based on NR/NX. These tracked positions, or data derived therefrom, values may be transmitted using any suitable protocol, e.g., the HyperText Transfer Protocol (HTTP), the Constrained Application Protocol (CoAP), or the like.

Input device 100 further comprises at least one actuator which is configured to restrict motion of the at least one fingertip to be within a three-dimensional shape. In particular, the at least one actuator may be configured to provide haptic feedback to any one of the finger, a hand, or an arm, of the user if activated, if the tracked position of the at least one fingertip deviates from being within the three-dimensional shape. The at least one actuator may, e.g., be a haptic actuator 104 which is integrated into data glove 100 and which is configured to render haptic feedback for sensing by a user wearing data glove 100. In FIG. 1, haptic actuator 101 is illustrated as covering the entire inner surface of data glove 100, but one may easily envisage embodiments of data glove 100 comprising one or more haptic actuators which cover only part of the inner surface of data glove 100, and accordingly only part over the wearer's hand. Haptic actuator 104 may be any type of actuator suitable for rendering haptic feedback to a user and may, e.g., be based on ultrasonic transducers, vibration motors (such as eccentric rotating mass motors and linear resonant actuators), electrostatic actuators, piezoelectric actuators, electric motors, and flexible actuated materials (such as elastometers, and shape memory alloy actuators).

In general, haptic perception consists of kinesthetic and tactile sense, and relates to the sensation of the size, shape, mass, texture, and stiffness, of physical objects, surfaces, etc. Kinesthetic sense refers to the information perceived by a person when moving joints, muscles, and tendons, while tactile sense refers to information retrieved via a person's skin. Depending on its type, haptic actuator 104 may either provide tactile feedback (e.g., tapping on the user's finger(s) or hand) or kinesthetic feedback (e.g., bending the user's finger(s) or hand). As an alternative, the at least one actuator may also be comprised in an exoskeleton-type of device 110, e.g., like the EduExo by Beyond Robotics (https://www.eduexo.com/eduexo-kit/), which is attached to an arm of the user. Exoskeleton-type of device 110 is in FIG. 1 illustrated as comprising two elongated members 118 which are attached, via straps 119, to a forearm and an upper arm of the user. By virtue of haptic actuator 111, elongated members 119 may be rotated relative to each other, with haptic actuator 111 acting as a hinge, so as to render kinesthetic content to the user, e.g., bending the arm of preventing the user from bending his/her arm. If haptic actuator 114 is comprised in a separate exoskeleton-type of device 110, input device 100 may communicate with exoskeleton-type of device 110 via communications interface 102, and a corresponding communications interface 112 comprised in exoskeleton-type of device 110, using any type of suitable protocol, e.g., HTTP or CoAP.

Input device 100 is further operative to determine whether computing device 150 requires user input from the at least one fingertip to be within the three-dimensional shape and, in response to determining that computing device 150 requires user input from the at least one fingertip to be within the three-dimensional shape, to activate haptic actuator(s) 104 or 114 so as to restrict motion of the at least one fingertip to be within the three-dimensional shape. For instance, input device 100 may be operative to determine whether computing device 150 requires user input from the fingertip to be within the three-dimensional shape based on an application being executed by computing device 150.

In the present context, the three-dimensional shape defines a region to which user input, i.e., the position of one or more fingertips of the user, is limited. The surface of the three-dimensional shape defines a boundary for the one or more fingertips providing user input. Input device 100 may further be operative to determine the three-dimensional shape based on a type of user input required by computing device 150, e.g., based on an application, i.e., software, being executed by computing device 150. The three-dimensional shape may be substantially two-dimensional, i.e., user input (the tracked positions of one or more fingertips) is restricted to be within a plane.

To this end, the three-dimensional shape defines user input, in terms of the tracked positions of one or more fingertips, which is acceptable by computing device 150 receiving the user input, or one or more applications which are executed on computing device 150. For instance, this may be the case if the user uses his/her finger, fingers, or hand, for controlling a CAD program which, for a certain operation, expects user input to be restricted to be, e.g., within a certain object which the user designs. As another example, one may consider the case of remote surgery, which may require that the operator (a surgeon) does not move the scalpel outside a certain three-dimensional region, which, e.g., may represent the inside of an organ. As a further example, one may consider the case of a remotely operated excavator in a mine, which may require that user input is restricted to be within a three-dimensional shape which corresponds to the walls of a tunnel in which the excavator is operating. In that way, the trajectory of, e.g., a remotely controlled vehicle or tool may be restricted to a certain three-dimensional motion trajectory.

Input device 100 may further be operative to position and orient the three-dimensional shape so as to reduce strain to at least one of a finger, a hand, or an arm, of the user when providing user input to computing device 150. For instance, this may be achieved by determining if the user perceives pain of fatigueness when providing user input with his/her finger(s) or hand. Pain and fatigueness may, e.g., be measured based on user input (the user indicating that he/she perceives pain or fatigueness), monitoring the user's muscle response, the user's facial expression, pulse, or eye movements, or monitoring the user's brain waves with a Brain Computer Interface (BCI). In response to the determination, actuator(s) 104/114 are controlled so as to force the user's finger(s) or hand into a more comfortable pose, resulting in less strain of the user's finger(s) or hand.

As an example, if the user is using a document editing program and has a habit of placing the hands with a pose such that the hands are not resting on an underlying surface, such as a table or desk, the muscles are in a strained position. In such scenario, one or more of actuator(s) 104 and 114 may be activated so as to guide the user's finger(s) and/or hand(s) into a position or pose which results in reduced strain. As a further example, the user's finger(s) and/or hand may be prevented from assuming a position/pose which has previously resulted in pain or fatigueness.

Figure 2:
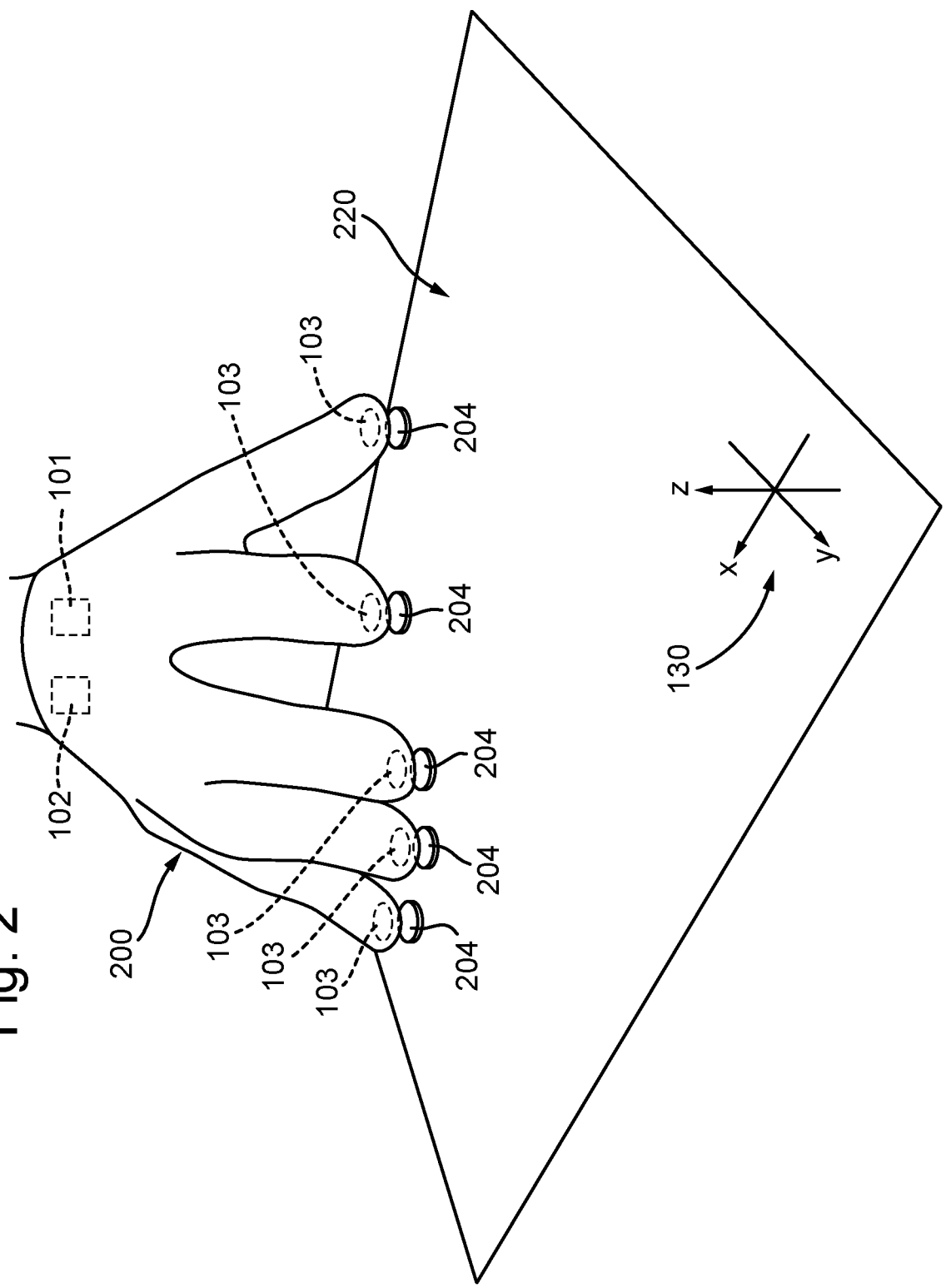
FIG. 2 shows another embodiment of the input device for a computing device.

In FIG. 2, an alternative embodiment of the input device is illustrated as a data glove 200. Similar to data glove 100, described hereinbefore with reference to FIG. 1, data glove 200 comprises at least one motion sensor 103 configured to be worn on a fingertip of a user. Data glove 200 further comprises processing means 101, described in further detail below with reference to FIGS. 3 and 4, which is operative to cause input device 200 to perform in accordance with embodiments of the invention set forth herein.

Similar to data glove 100, data glove 200 is operative to track a position of the at least one fingertip using motion sensor(s) 103, provide the tracked position as user input to a computing device (such as computing device 150 illustrated in FIG. 1, which is omitted from FIG. 2 for sake of clarity), determine whether computing device 150 requires user input from the fingertip to be within the three-dimensional shape, and in response thereto, activate an actuator configured to restrict motion of the at least one fingertip to be within the three-dimensional shape if computing device 150 requires user input from the fingertip to be within the three-dimensional shape.

Different from data glove 100 which comprises a haptic actuator 104 and/or 114 for providing tactile and/or kinesthetic feedback to one or more fingers, a hand, and/or an arm, of the user, the at least one actuator 204 configured to restrict motion of the at least one fingertip to be within a three-dimensional shape comprises an electromagnet configured to adhere to a magnetic surface, if activated. The magnetic surface may, e.g. a magnetic surface or a table, desk, or other piece of furniture, or a magnetic pad 220 which, similar to a mouse pad, is placed on a flat surface such as a table or desk. When activated, electromagnetic actuator(s) 204 render an attractive force between electromagnetic actuator(s) 204 and magnetic surface 220. As a result, and depending on the force of attraction (which is determined by the strength of a magnetic field induced by electromagnetic actuator(s) 204), the one or more fingertips are restricted to move along magnetic surface 220, i.e., within a (two-dimensional) plane. In other words, the three-dimensional shape is substantially two-dimensional.

As an alternative to activating electromagnetic actuator(s) 204 so as to restrict motion of the one or more fingertips to magnetic surface 220, input device 200 may be operative to activate electromagnetic actuator(s) 204 if the tracked position of the at least one fingertip deviates from being substantially two-dimensional. In other words, in order to restrict user input to be two-dimensional, when the user's fingertip(s) is/are moving within the plane defined by magnetic surface 220 (i.e., in the x and y direction in FIG. 2), no actuation is provided (electromagnetic actuator(s) 204 are not activated). If, on the other hand, a fingertip moves in a direction perpendicular to the plane defined by magnetic surface 220 (the z direction in FIG. 2), the respective electromagnetic actuator 204 is activated to attract the fingertip and force it back to magnetic surface 220. For instance, the force generated by electromagnetic actuator(s) 204 may increase with increasing distance between fingertip and magnetic surface 220.

Optionally, input device 200 may further be operative to control a strength of adhesion between electromagnetic actuator(s) 204 and magnetic surface 220 so as to provide a sense of friction to the at least one fingertip, when moving across magnetic surface 220. This may be achieved by controlling a current through electromagnetic actuator(s) 204, since induced magnetic field strength is proportional to the current through the coil of an electromagnet, and the resulting friction is, in turn, proportional to the induced magnetic field strength.

Electromagnetic actuator(s) 204 may be attached to input device 200, e.g., in the form of a glove as in FIG. 2, by means of a flexible element which allows the user to change the orientation of his/her finger(s) even when actuator(s) 204 is/are actuated, i.e., when adhering to magnetic surface 220. The flexible element may optionally be actuatable so as to restrict the change in orientation of the finger(s). For instance, the flexible element may comprise a fabric with controllable flexibility. If activated, the flexibility of the fabric is reduced, thereby restricting the possibility of changing the orientation of the finger. As an alternative, the flexible element may be based on a ball-and-socket joint which may be locked, e.g., using another electromagnetic actuator, to prevent a relative motion between ball and socket if activated.

As an alternative to proving actuators 204 with electromagnets, magnetic surface 220 may be provided with electromagnets, preferably arranged in an array, which are configured to adhere to a magnetic material provided at one or more fingertips (at the locations of actuators 204 in FIG. 2), if activated.

Input device 200 may further be operative to actuate one or more kinesthetic actuators which are configured to restrict the motion of the fingers, hand(s), or arm(s), of the user, so as to reduce the risk for strain or damage on these body parts when providing user input. For instance, this may be the case if electromagnetic actuator(s) 204 is/are actuated so as to adhere the at least one fingertip to magnetic surface 220. In such situations, in which the mobility of the finger(s) is limited, it may be advantageous to restrict the motion of the user's hand(s) and/or arm(s) so as to avoid a change in pose which is potentially harmful to the user's body parts, in particular his/her joints. This may be achieved by actuating kinesthetic actuators, such as actuators 104 and 114 described with reference to FIG. 1, accordingly. It will be appreciated that additional or alternative, embodiments of input device 100 described hereinbefore with reference to FIG. 1 may also be envisaged for input device 200.

In the following, determining whether computing device 150 requires user input from the fingertip to be within a three-dimensional shape, and optionally determining the three-dimensional shape based on a type of user input required by computing device 150, is further elucidated.

For instance, the determination may be based on whether an application which is executed by computing device 150 requires user input in two or three dimensions If two-dimensional user input is required, the user's finger(s) is/are restricted to move within a plane. If, on the other hand, the application required user input in three dimensions, the user's finger(s) are not restricted at all, and can move freely, or may be restricted to be within a three-dimensional shape. This shape may, e.g., reflect a boundary of a cavity, such as a human organ or a tunnel in a mine, in which a remotely controlled tool is operating. Upon a transition between restricted and unrestricted user input, or between two-dimensional and three-dimensional user input, or vice versa, the transition may be indicated to the user via haptic feedback to the user finger(s), hand, or arm, e.g., by a push or pull up/down effect provided to the user to indicate that a transition is about to be effected.

As another example, the individual activating of one or more of actuators 104/114/204 may depend on the type of user input which is required by computing device 150, or an application which is executed by computing device 150. For instance, if precise movement of one finger is required, e.g., for selecting a user-interface object, all other fingertips may be "locked", i.e., be prevented from moving. Thereby, an improved precision of the freely-moving finger is achieved. Likewise, all fingertips may be allowed to move freely if comparatively unprecise user input is required.

In the following, embodiments of processing means 101 comprised in input device 100/200 are described with reference to FIGS. 3 and 4.

Figure 3:
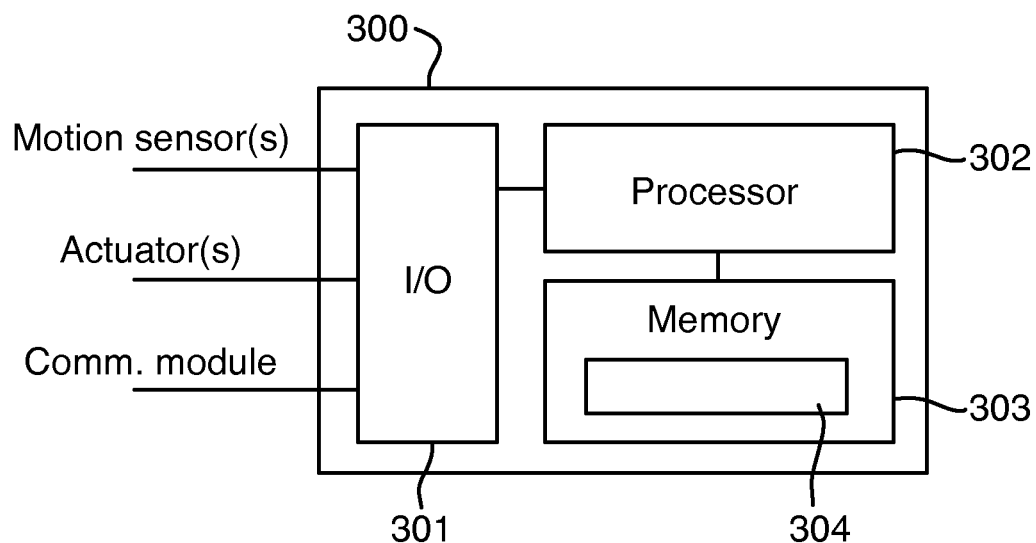
FIG. 3 illustrates an embodiment of the processing means comprised in the input device.

An embodiment 300 of processing means 101 is shown in FIG. 3. Processing means 300 comprises a processing unit 302, such as a general-purpose processor, and a computer-readable storage medium 303, such as a Random-Access Memory (RAM), a Flash memory, or the like. In addition, processing means 300 comprises one or more interfaces 301 ("I/O" in FIG. 3) for controlling and/or receiving information from other components comprised in input device 100/200, such as motion sensor(s) 103, actuator(s) 104, and communications interface 102. Memory 303 contains computer-executable instructions 304, i.e., a computer program or software, to cause input device 100/200 to become operative in accordance with embodiments of the invention as described herein, when computer-executable instructions 304 are executed on processing unit 302.

Figure 4:
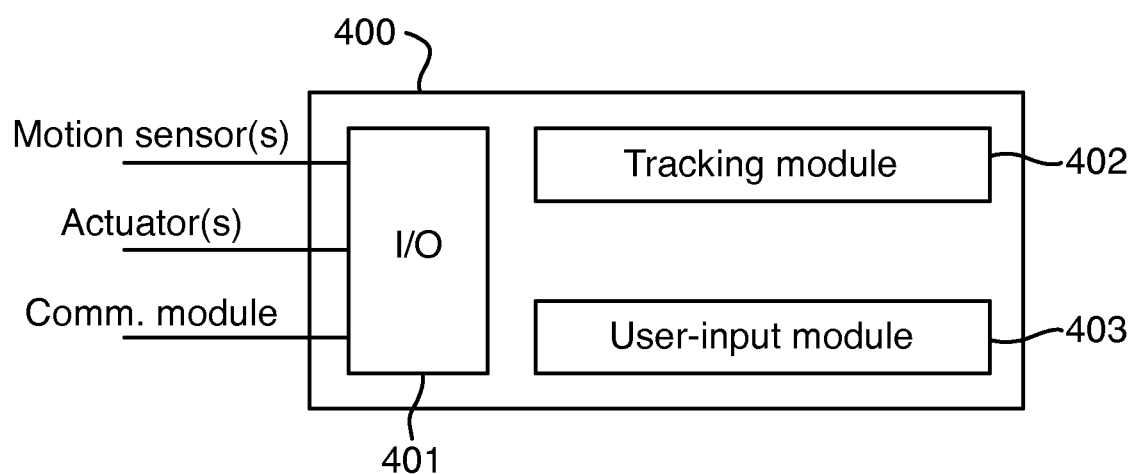
FIG. 4 illustrates another embodiment of the processing means comprised in the input device.

An alternative embodiment 400 of processing means 102 is illustrated in FIG. 4. Similar to processing means 300, processing means 400 comprises one or more interfaces 401 ("I/O" in FIG. 4) for controlling and/or receiving information from other components comprised in input device 100/200, such as motion sensor(s) 103, actuator(s) 104, and communications interface 102. Processing means 400 further comprises a tracking module 402 and a user-input module 403, which are configured to cause input device 100/200 to become operative in accordance with embodiments of the invention as described herein.

In particular, tracking module 402 is configured to track a position of at least one fingertip of a user using at least one motion sensor 103 configured to be worn on the fingertip, and user-input module 403 is configured to provide the tracked position as user input to computing device 150. User-input module 403 is further configured to determine whether computing device 150 requires user input from the fingertip to be within a three-dimensional shape, and, in response thereto, activate actuator (s) 104/114/204 configured to restrict motion of the at least one fingertip to be within the three-dimensional shape if computing device 150 requires user input from the fingertip to be within the three-dimensional shape.

Optionally, the three-dimensional shape may be substantially two-dimensional.

For instance, actuator(s) 204 configured to restrict motion of the at least one fingertip may comprise an electromagnet configured to adhere to magnetic surface 220, if activated. Optionally, user-input module 403 may further be configured to activate the electromagnet if the motion of the at least one fingertip deviates from being substantially two-dimensional. Further optionally, user-input module 403 may further be configured to control a strength of adhesion between the electromagnet and magnetic surface 220 so as to provide a sense of friction to the at least one fingertip, when moving across magnetic surface 220.

Alternatively, actuator(s) 104/114 configured to restrict motion of the at least one fingertip may comprise one or more haptic actuators configured to provide haptic feedback to any one of the finger, a hand, or an arm, of the user if activated, if the motion of the at least one fingertip deviates from being within the three-dimensional shape.

Optionally, user-input module 403 may further be configured to position and orient the three-dimensional shape so as to reduce strain to at least one of a finger, a hand, or an arm, of the user when providing input to computing device 150.

Optionally, user-input module 403 may be configured to determine whether computing device 150 requires user input from the fingertip to be within the three-dimensional shape based on an application being executed by computing device 150.

Optionally, user-input module 403 may further be configured to determine the three-dimensional shape based on a type of user input required by computing device 150. For instance, user-input module 403 may be configured to determine the three-dimensional shape is based on an application being executed by computing device 150.

Modules 402 and 403 comprised in processing mean 400 may further be configured to perform additional or alternative operations in accordance with embodiments of the invention, as described herein.

Interfaces 301 and 401, and modules 402 and 403, as well as any additional modules comprised in processing means 400, may be implemented by any kind of electronic circuitry, e.g., any one, or a combination of, analogue electronic circuitry, digital electronic circuitry, and processing means executing a suitable computer program, i.e., software.

Figure 5:
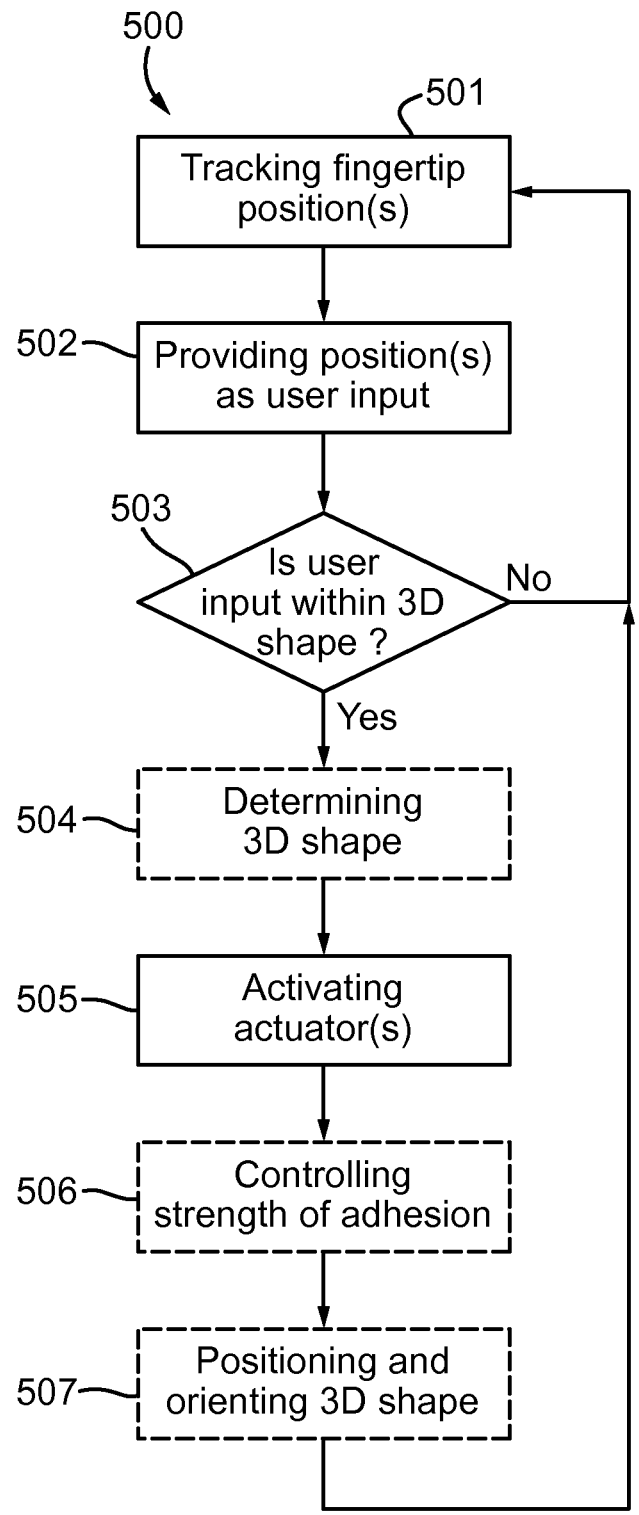
FIG. 5 shows a method of providing user input to a computing device, in accordance with embodiments of the invention.

In the following, embodiments 500 of the method of providing user input to a computing device are described with reference to FIG. 5.

Method 500 is performed by an input device and comprises tracking 501 a position of at least one fingertip of a user using at least one motion sensor configured to be worn on the fingertip, and providing 502 the tracked position as user input to the computing device. Method 500 further comprises determining 503 whether the computing device requires user input from the fingertip to be within a three-dimensional shape, and in response thereto, activating 505 at least one actuator configured to restrict motion of the at least one fingertip to be within the three-dimensional shape if the computing device requires user input from the fingertip to be within the three-dimensional shape. Optionally, the three-dimensional shape may be substantially two-dimensional.

For instance, the at least one actuator configured to restrict motion of the at least one fingertip may comprise an electromagnet configured to adhere to a magnetic surface, if activated 505. Optionally, the at least one actuator configured to restrict motion of the at least one fingertip to be within the three-dimensional shape may be activated 505 if the motion of the at least one fingertip deviates from being substantially two-dimensional.

Optionally, method 500 may further comprise controlling 506 a strength of adhesion between the electromagnet and the magnetic surface so as to provide a sense of friction to the at least one fingertip, when moving across the magnetic surface.

Alternatively, the at least one actuator being configured to restrict motion of the at least one fingertip may comprise one or more haptic actuators configured to provide haptic feedback to any one of the finger, a hand, or an arm, of the user if activated 505, if the motion of the at least one fingertip deviates from being within the three-dimensional shape.

Optionally, method 500 may further comprise positioning and orienting 507 the three-dimensional shape so as to reduce strain to at least one of a finger, a hand, or an arm, of the user when providing input to the computing device.

Optionally, determining 503 whether the computing device requires user input from the fingertip to be within the three-dimensional shape may be based on an application being executed by the computing device.

Optionally, method 500 may further comprise determining 504 the three-dimensional shape based on a type of user input required by the computing device. For instance, determining 504 the three-dimensional shape may be based on an application being executed by the computing device.

It will be appreciated that method 500 may comprise additional, or modified, steps in accordance with what is described throughout this disclosure. An embodiment of method 500 may be implemented as software, such as computer program 304, to be executed by a processing unit comprised in an input device, such as a data glove, whereby the input device becomes operative in accordance with embodiments of the invention described herein.

The person skilled in the art realizes that the invention by no means is limited to the embodiments described above. On the contrary, many modifications and variations are possible within the scope of the appended claims.

The invention claimed is:

1. An input device for a computing device, the input device comprising:
   at least one motion sensor configured to be worn on at least one fingertip of a user, and
   at least one actuator configured to restrict motion of the at least one fingertip to be within a three-dimensional shape,
   wherein the input device is operative to:
   track a position of the at least one fingertip using the at least one motion sensor, provide the tracked position as user input to the computing device,
   detect that the tracked position of the at least one fingertip deviates from being within the three-dimensional shape,
   determine whether the computing device requires user input from the at least one fingertip to be within the three-dimensional shape, and
   in response to determining that the computing device requires user input from the at least one fingertip to be within the three-dimensional shape and if the tracked position of the at least one fingertip deviates from being within the three-dimensional shape, activate the at least one actuator configured to restrict motion of the at least one fingertip to be within the three-dimensional shape.

2. The input device according to claim 1, wherein the three-dimensional shape is substantially two-dimensional.

3. The input device according to claim 2, the at least one actuator being configured to restrict motion of the at least one fingertip comprising an electromagnet configured to adhere to a magnetic surface, if activated.

4. The input device according to claim 3, being operative to activate the electromagnet if the tracked position of the at least one fingertip deviates from the substantially two-dimensional shape.

5. The input device according to claim 3, being further operative to control a strength of adhesion between the electromagnet and the magnetic surface so as to provide a sense of friction to the at least one fingertip, when moving across the magnetic surface.

6. The input device according to claim 1, the at least one actuator being configured to restrict motion of the at least one fingertip comprising one or more haptic actuators configured to provide haptic feedback to any one of the finger, a hand, or an arm, of the user if activated.

7. The input device according to claim 1, being further operative to position and orient the three-dimensional shape so as to reduce strain to at least one of a finger, a hand, or an arm, of the user when providing user input to the computing device.

8. The input device according to claim 1, being operative to determine whether the computing device requires user input from the at least one fingertip to be within the three-dimensional shape based on an application being executed by the computing device.

9. The input device according to claim 1, being further operative to determine the three-dimensional shape based on a type of user input required by the computing device.

10. The input device according to claim 9, being operative to determine the three-dimensional shape based on an application being executed by the computing device.

11. The input device according to claim 1, being a glove comprising a plurality of motion sensors to be worn on respective fingertips.

12. The input device according to claim 1, the at least one actuator configured to restrict motion of the at least one fingertip being an exoskeleton-type of actuator attached to an arm of the user.

13. The input device according to claim 1, wherein the surface of the three-dimensional shape corresponds to a boundary of the motion of the at least one fingertip.

14. The input device according to claim 1, wherein
    the three-dimensional shape is associated with a first virtual object,
    a second virtual object is controlled based on the tracked position, and
    restricting the motion of the at least one fingertip to be within the three-dimensional shape causes a trajectory of the second virtual object to be restricted within the first virtual object.

15. A method of providing user input to a computing device, the method being performed by an input device, the method comprising:
- tracking a position of at least one fingertip of a user using at least one motion sensor configured to be worn on said at least one fingertip,
- providing the tracked position as user input to the computing device,
- detecting that the tracked position of the at least one fingertip deviates from being within the three-dimensional shape,
- determining whether the computing device requires user input from the at least one fingertip to be within a three-dimensional shape, and
- in response to determining that the computing device requires user input from the at least one fingertip to be within a three-dimensional shape and if the tracked position of the at least one fingertip deviates from being within the three-dimensional shape, activating at least one actuator configured to restrict motion of the at least one fingertip to be within the three-dimensional shape.

16. The method according to claim 15, wherein the three-dimensional shape is substantially two-dimensional.

17. The method according to claim 16, the at least one actuator being configured to restrict motion of the at least one fingertip comprising an electromagnet configured to adhere to a magnetic surface, if activated.

18. The method according to claim 17, wherein the at least one actuator configured to restrict motion of the at least one fingertip to be within the three-dimensional shape is activated if the motion of the at least one fingertip deviates from being substantially two-dimensional.

19. The method according to claim 17, further comprising controlling a strength of adhesion between the electromagnet and the magnetic surface so as to provide a sense of friction to the at least one fingertip, when moving across the magnetic surface.

20. The method according to claim 15, the at least one actuator being configured to restrict motion of the at least one fingertip comprising one or more haptic actuators configured to provide haptic feedback to any one of the finger, a hand, or an arm, of the user if activated.

21. The method according to claim 15, further comprising positioning and orienting the three-dimensional shape so as to reduce strain to at least one of a finger, a hand, or an arm, of the user when providing input to the computing device.

22. The method according to claim 15, wherein the determining whether the computing device requires user input from the at least one fingertip to be within the three-dimensional shape is based on an application being executed by the computing device.

23. The method according to claim 15, further comprising determining the three-dimensional shape based on a type of user input required by the computing device.

24. The method according to claim 23, wherein the determining the three-dimensional shape is based on an application being executed by the computing device.

25. The method according to claim 15, the input device being a glove comprising a plurality of motion sensors to be worn on respective fingertips.

26. The method according to claim 15, the at least one actuator configured to restrict motion of the at least one fingertip being an exoskeleton-type of actuator attached to an arm of the user.

* * * * *